Patented Sept. 16, 1947

2,427,512

UNITED STATES PATENT OFFICE 2,427,512

DICYANDIAMIDE-ALDEHYDE PRODUCT

Milton J. Scott, Springfield, Mass., assignor to Monsanto Chemical Company, St. Louis, Mo., a corporation of Delaware No Drawing. Application October 23, 1943, Serial No. 507,481

21 Claims. (Cl. 260—42)

This invention relates to new dicyandiamide-aldehyde condensation products and a method of making the same. More particularly, this invention relates to dicyandiamide-formaldehyde resins modified by mono-amino-diphenyl compounds such as mono-ortho-amino-diphenyls.

In making dicyandiamide-formaldehyde condensation products, an initial addition product of dicyandiamide and the formaldehyde may be formed by reacting dicyandiamide with formaldehyde in aqueous solution. The resulting product may then be subjected to distillation to remove the water present. Due to the high melting point of the initial reaction product and the tendency of said product to polymerize, serious difficulties are encountered in attempting to thoroughly remove water by distillation without causing excessive polymerization. Also, molded products made from such dicyandiamide-formaldehyde condensation have a high rate of shrinkage on aging, are somewhat brittle and tend to develop cracks, particularly around metal inserts.

According to the present invention, it has been found that improved dicyandiamide-aldehyde condensation products may be obtained by incorporating therein mono-amino-diphenyl, preferably, mono-ortho-amino-diphenyl, mono-para-amino-diphenyl, or a mixture of such compounds. These mono-amino-diphenyls may be substituted in the ring with halogen, alkyl or other groups which are not reactive with aldehydes under the conditions of reaction such as aliphatic, aromatic, alphyl groups. Examples of such products are 2'-chloro-2-amino-diphenyl, 4' - chloro-2-amino-diphenyl, 4,4'-dichloro - 2 - amino-diphenyl, 2',4'-dichloro-2-amino - diphenyl, 2',4',6'-trichloro-2-amino-diphenyl, 2'4'6' - 4-tetrachloro-2-amino-diphenyl, 3,5 - dinitro - 2 - amino-diphenyl, 5-hydroxy-2-amino-diphenyl, a mixture of about one part of 2'-chloro-2-amino-diphenyl and two parts of 4'-chloro - 2 - amino-diphenyl, 2'-methyl-2-amino-diphenyl, 4'-methyl-2-amino-diphenyl, 4-4'-diethyl - 2 - amino-diphenyl, 2'-ethyl-4'-methyl-2-amino-diphenyl, 2'-4'-6'-trimethyl-2-amino-diphenyl, 2'-4'-6'-4-tetraethyl-2-amino-diphenyl, 2'-propyl-2-amino-diphenyl, 4'-butyl-2-amino-diphenyl, 4' - phenyl - 2 - amino-diphenyl, 4'-benzyl-2-amino-diphenyl, 4'-toluyl-2-amino-diphenyl, and the like. Mixtures of any of the foregoing may also be used.

According to one embodiment of this invention, it has been found that it is especially advantageous to initially react dicyandiamide and formaldehyde and then react the resulting methylol derivatives of dicyandiamide with mono-ortho-amino-diphenyl. Thus, it has been found that such a product is lower in melting point and reactivity than the corresponding dicyandiamide-formaldehyde condensation product and may be dehydrated more completely and conveniently by distillation without causing substantial advancement of the condensation of the resin. The resulting dehydrated product may then be further processed, for example, to form molded products with unexpected and advantageous properties.

In preparing the products of the present invention, the relative proportions of dicyandiamide, formaldehyde, and mono-ortho-amino-diphenyl may be varied through a substantial range. However, certain advantageous limits are set forth hereinafter although the invention is not to be considered limited thereto. Thus, it is desirable to have a molar ratio of formaldehyde to dicyandiamide of at least about 1:1 and, in general, in preparing an initial dicyandiamide-formaldehyde addition product, it is advantageous to employ a molar ratio of formaldehyde to dicyandiamide sufficiently higher than 1:1 so that the final product will require at most only small additions of aldehydic substances or their reactive condensation products to become thermosetting. For example, a molar ratio of formaldehyde to dicyandiamide of at least 1.5:1 is generally preferred. In addition, the foregoing ratios may be used when employing other aldehydes, but some of the preferred ratios are set forth hereinafter.

While it is theoretically possible to react 4 mols of formaldehyde with each mol of dicyandiamide, in carrying out the process of the present invention it is generally advantageous to react initially not over 3.5 mols of formaldehyde with each mol of dicyandiamide, thereby avoiding the formation of a product too reactive to process conveniently.

According to a preferred embodiment of the process of this invention, addition products of dicyandiamide and formaldehyde are initially formed and then reacted with mono-ortho-amino-diphenyl. The addition products of formaldehyde and dicyandiamide are commonly referred to as methylol derivatives of dicyandiamide. Thus, it is possible to produce mono-, di-, tri-, and tetra-methylol dicyandiamide or mixtures thereof. It is probable that when formaldehyde reacts with dicyandiamide, mixtures of methylol derivatives are formed. However, such mixtures consist principally of the methylol derivatives most closely corresponding to the molar ratio of formaldehyde employed. Since fractional methylol derivatives cannot be formed, when fractional molar ratios of formaldehyde to dicyandiamide are employed, the principal methylol derivatives are correspondingly distributed between the next higher and the next lower methylol derivatives. One of the preferred ratios of aldehyde to dicyandiamide is 2.5:1, which produces a mixture of di- and tri-methylol dicyandiamide.

According to one of the preferred embodiments of this invention, formaldehyde is reacted with the dicyandiamide only until the desired proportion of the formaldehyde present has reacted and not substantially beyond the monomeric methylol dicyandiamide.

It is further preferred that substantially all of the formaldehyde be reacted with the dicyandiamide before the mono-ortho-amino-diphenyl is added. By carrying out the reaction in this manner it is believed that the mono-amino-diphenyl compound reacts substantially only with methylol groups attached to the dicyandiamide. Thus, a preferred manner of carrying out the reaction is to treat dicyandiamide with formaldehyde under substantially neutral conditions in the molar ratio of 2–3 mols of formaldehyde to one mol of dicyandiamide until substantially all of the formaldehyde has reacted. This product is then treated with about 1–1.5 mols of mono-ortho-amino-diphenyl for each mol of dicyandiamide employed.

The lower limit of the mono-amino-diphenyl added according to a preferred embodiment of this invention is the amount needed to give a reaction product with a sufficiently low melting point so that dehydration may be carried out without substantially advancing the degree of polymerization of the product. The amount necessary to produce this advantageous and unexpected effect varies to some extent with the particular partial condensation product of dicyandiamide and formaldehyde employed. In general, when from 1.5 to 3.5 mols of formaldehyde are reacted with 1 mol of dicyandiamide only to the extent of insuring substantially complete addition of the formaldehyde to the dicyandiamide, from about 0.5 to about 1 or 2 mols of mono-amino-diphenyl, or one of the ring-substituted mono-amino-diphenyls referred to hereinbefore are sufficient to produce a product that can be readily dehydrated by vacuum distillation.

In general, it is desirable that the thoroughly dehydrated reaction products of the methylol dicyandiamide and the mono-amino-diphenyl possess a softening point as determined by the copper bar method given below, at least as low as 110–120, for example 115° C. or below. Such softening temperatures are exhibited, for example, by the reaction products of 0.5 mol of mono-ortho-amino-diphenyl and the water-soluble addition product of 2 mols of formaldehyde with 1 mol of dicyandiamide. In addition to these softening temperatures, a partial condensation product of, for example, 2 mols of formaldehyde and 1 mol of dicyandiamide, softens at these low temperatures only when a substantial amount of water is allowed to remain in the partial condensation product. The copper bar softening point determination referred to above is carried out in the following manner.

A copper bar, which in dimension is approximately 2 inches by 2 inches by 19 inches, is heated at one end and cooled at the other end so that a temperature differential exists along the length of the bar. This temperature differential is measured by 19 mercury thermometers which are inserted into the bar at intervals of 1 inch and the temperature differential is such that there is a difference between successive thermometers of 2 to 3° C.

In carrying out the test, the resin in the form of a powder which will pass through a 140-mesh screen is sprinkled onto the bar. After the powdered resin has been in contact with the bar for about 10 seconds, the softening point test is made. This is done by attempting to brush the powdered resin off the bar with a fine camel's hair brush and noting where the resin adheres to the bar. The temperature noted as the softening point is the lowest temperature of the bar at which the powdered resin adheres to the bar.

The upper limit of the mono-amino-diphenyl added to the dicyandiamide-formaldehyde addition product according to the preferred embodiment of this invention is determined in general by the number of methylol groups present and the nature of the product desired. Thus, in general, it is preferred that the molar proportion of the mono-amino-diphenyl to aldehyde does not exceed 1:1.

However, while the preferred procedure given hereinbefore calls for conditions that tend to result in all of the mono-amino-diphenyl being attached to the methylol products, the present invention contemplates resinous dicyandiamide-formaldehyde products containing mono-amino-diphenyl residues present in other states of chemical combination. For example, a methylol dicyandiamide may be treated with mono-amino-diphenyl in molar excess of the methylol groups present and the excess of mono-amino-diphenyl reacted with additional formaldehyde so that in the final product the mono-amino-diphenyl may be present as a separate mono-amino-diphenyl complex.

The addition products of dicyandiamide and formaldehyde may be formed at a pH of 5–9. However, according to a preferred embodiment of this invention, the dicyandiamide is reacted with the formaldehyde under substantially neutral conditions, for example, at a pH of 6.5 to 7.5. A pH in this range is particularly desirable during the initial reaction between formaldehyde and dicyandiamide to form the initial methylol compounds as well as during the dehydration thereof.

During the reaction of the mono-amino-diphenyl with the dicyandiamide-formaldehyde addition product, it may be advantageous to have present a water-insoluble solvent for the ultimate reaction product such as xylene, toluene and the like, particularly when a low proportion of mono-amino-diphenyl to dicyandiamide is employed, for example, when a molar ratio of mono-amino-diphenyl to dicyandiamide of 1:1 or less is employed. For example, such a solvent may be employed to expedite the thorough removal of the water during the subsequent dehydration by subjecting the reaction mixture to distillation and continuously separating and returning to the reaction vessel the distillate layer containing the water insoluble solvent until the water is entirely removed and thereafter removing the water-insoluble solvent.

Illustrative of the process according to the present invention, but not limitative thereof, are the following specific examples. Parts are parts by weight.

Example I

A mixture of 840 parts of dicyandiamide (10 molecular proportions) and 1620 parts of an aqueous 37% solution of formaldehyde (20 molecular proportions) in a vessel equipped with a reflux condenser is treated with a sufficient amount of a 2.25 normal solution of trimethyl phenyl ammonium hydroxide (approximately 7.5 parts required) to increase the pH of the mixture to about 7.0 as shown by a glass electrode. The resulting mixture is heated to reflux temperature in about ½ hour at which time all of the dicyandiamide is in solution. To this product are added 1,690 parts of melted mono-ortho-amino-diphenyl (10 molecular proportions) and the resulting mixture is heated at reflux temperature with vigorous agitation for ¾ hour to form a clear reaction product containing water dispersed therein. This product is then dehydrated by distillation at atmospheric pressure and at a temperature that gradually increases from 100 to 125° C. The distillation is continued at 125° C. and under gradually increasing vacuum until a vacuum corresponding to 27–29 inches of mercury has been reached and maintained for a short period of time, e. g., 10–15 minutes. The resulting dehydrated resin is then withdrawn from the reaction vessel and cooled. The cooled resin is a clear, brittle product that is readily comminuted for further processing. It does not become thermoset even after 15 minutes on a 150° C. hot plate.

This resinous product is water-insoluble, but soluble in furfural, furfuryl alcohol and somewhat soluble in coal tar solvents such as xylene and toluene. It is soluble in dilute acids, for example, hydrochloric or sulfuric acids, forming salts therewith.

Example II

The process described in Example I is repeated except that the proportion of mono-ortho-amino-diphenyl is decreased to 845 parts (5 molecular proportions). The product obtained possesses properties similar to those of the product described in Example I. However, the product of the present example has a higher melting point and is more readily converted into the thermoset state than the product described in Example I.

Example III

The process described in Example I is repeated except that a molar ratio of formaldehyde to dicyandiamide of 3:1 and a molar ratio of mono-ortho-amino-diphenyl to dicyandiamide of 1.5:1 are employed. The product after reaction with the mono-ortho-amino-diphenyl is readily dehydrated by vacuum distillation and the resulting material possesses properties similar to those of the product in Example I.

Example IV 840 parts (10 molecular proportions) of dicyandiamide are mixed with 1620 parts (20 molecular proportions) of an aqueous solution of formaldehyde (37% HCHO). The pH of this mixture is increased to about 7 (glass electrode) by the addition of an aqueous sodium hydroxide solution (5% NaOH). The resulting mixture is heated to boiling in a vessel equipped with a reflux condenser (requires about 30 minutes), whereupon a clear, aqueous solution is formed that does not precipitate when passed into ice water. To this product 1690 parts of melted mono-ortho-amine-diphenyl (10 molecular proportions) and 100 parts of xylene are added. The resulting mixture is heated at reflux temperature for about 45 minutes. The product obtained comprises a clear, resinous mass containing water dispersed therein. This product is then concentrated by distillation at atmospheric pressure and at a temperature gradually increasing to about 125 to 130° C. The distillation is continued at the latter temperature under vacuum conditions until a vacuum corresponding to about 27–29 inches of mercury is obtained. During this distillation the xylene that distills over is continually returned to the reaction mixture and the distillation is continued until water is no longer distilled off and thereafter xylene is allowed to distill off. The resulting resinous reaction product possesses properties similar to those of the product described in Example I.

The products described in Examples I–IV may be employed for various purposes for which synthetic resins are adaptable. In particular, these products have been found to have special advantages in preparing thermosetting molding compositions. The products described in Examples I–IV are essentially non-thermosetting and require reaction with additional quantities of a reactive methylene-group-or substituted methylene group-containing compound such as formaldehyde, paraformaldehyde, or other aldehyde, hexamethylene tetramine, or formaldehyde partial condensation products in order to be heat cured to infusible, insoluble products. Examples of the latter class of compounds include methylol aminotriazines, for example, tetra-methylol melamine, methylol ureas, and methylol amides such as dicyandiamide-formaldehyde partial condensation products. Also, when desirable, partial condensation products of formaldehyde and phenols are employed. While, in general, the reactive methylene-group-containing compositions are obtained by partial reaction of formaldehyde with a suitable material, partial reaction products of other aldehydes may be advantageous. In such cases the thermosetting properties are obtained from a reactive substituted methylene-group-containing composition.

One embodiment of a methylol melamine that may be employed to render thermosetting such resins as those described in Examples I–IV may be prepared by reacting an aqueous mixture containing formaldehyde and melamine in a molar ratio of about 4:1 at a pH of about 7.5 to 8.5 until a slight precipitate is obtained when a portion of the reaction mixture is passed into ice water, and then partially dehydrating the resulting product by distillation first at atmospheric pressure and then under a vacuum corresponding to 20–21 inches of mercury, at temperatures not exceeding about 115° C.

Another example of a suitable reactive methylene-group-containing composition is one prepared by mixing 60 grams (1 mol) of urea with 162 grams (2 mols) of an aqueous formaldehyde solution (37% HCHO), adjusting the pH to about 8.3 with an aqueous sodium hydroxide solution (5% NaOH), heating this mixture to boiling and boiling under reflux conditions for about 15 minutes, then adjusting the pH to about 5.0 and continuing the boiling until a precipitate is obtained on passing a portion of the product into ice water, then adjusting the pH to about 8.3 and then dehydrating the product first at atmospheric pressure and then at a vacuum corresponding to about 20-21 inches of mercury at a temperature not exceeding about 112° C.

A still further example of a reactive methylene group-containing composition is one prepared by reacting 84 grams (1 mol) of dicyandiamide with 162 grams (2 mols) of an aqueous formaldehyde solution (37% HCHO) at a pH of about 7.0 by heating the mixture to boiling over a period of about 30 minutes and then immediately subjecting the product to distillation at a vacuum corresponding to about 27-29 inches of mercury. This causes the temperature of the mixtrure to drop and as the water is boiled off, the mixture increases in viscosity. When the viscosity becomes so high as to greatly slow down the effectiveness of the dehydration, the degree of vacuum is lowered and the temperature raised until in the final stages the distillation is carried out at a vacuum corresponding to 20-21 inches of mercury at a temperature of 110-120° C.

The following examples are illustrative of the preparation of thermosetting molding compositions. Parts are by weight.

Example V 100 parts of the product prepared as described in Example I are mixed with 100 parts of the partial melamine-formaldehyde condensation product described above. The resulting mixture becomes thermoset after 3 minutes on a 150° C. hot plate. 5.0 parts of zinc stearate, 68 parts of cotton flock and 272 parts of silica flour are added to the foregoing mixture in the well known manner for preparing molding compositions.

Molded products are prepared from the foregoing thermosetting molding composition by subjecting the composition to heat and pressure in a suitable mold. For example, disks ⅛″ in thickness may be molded by subjecting the molding composition to a pressure of 3000 pounds per square inch and a temperature of 150° C. for 7 minutes. The resulting products exhibit a degree of shrinkage after molding that is only a fraction of that exhibited by molded products whose preparation differs only in that unmodified melamine-formaldehyde resin is employed in place of the mixture of resins.

Another outstanding characteristic of the molded products of this invention as illustrated by the product described in Example V are their resistance to cracking when metal or other non-shrinking inserts are included therein. While molded products made from unmodified melamine-formaldehyde resins and containing metal inserts tend to crack in the area surrounding the inserts within a few days after molding, the molded products of Example V containing metal inserts do not crack after long continued use.

The proportion of the melamine-formaldehyde condensation product or other thermosetting condensation product employed in conjunction with the products of this invention illustrated by Examples I-IV may be substantially varied, but advantageously from 25 to 400 parts of the thermosetting resin are employed for every 100 parts of the ortho-amino-diphenyl modified resin.

Example VI

Example V is repeated except that 10 parts of "Vinsol" resin (reported to be an extracted pine wood pitch as described in U. S. Patent 2,060,856) is included in the mixture of resins. The resulting mixture is found to become thermosetting after 45 seconds heating on a 150° C. hot plate. Molding compositions prepared as in Example V employing this mixture required a shorter molding period but the molded products possess the same advantageous characteristics as the molded products described in Example V.

Example VII 100 parts of the product described in Example I are mixed with 10 parts of paraformaldehyde, 3 parts of "Vinsol" resin, 2.5 parts of zinc stearate and 170 parts of asbestos in a manner well known to those skilled in the art of preparing thermosetting molding compositions. Molded products prepared from these compositions possess the same characteristic properties as those described in Example V.

Example VIII 20 parts of the product prepared as described in Example I are mixed with 80 parts of the partial melamine-formaldehyde condensation product employed in Example V. To the foregoing mixture are added 67 parts of alpha-cellulose as a filler. The resulting mixture may be molded by the application of heat and pressure as set forth in Example V, to produce molded products having substantially reduced shrinkage and other advantageous characteristics as compared with a similar product in which the partial melamine-formaldehyde condensation product is the sole resin employed.

The extracted pine wood pitch employed in the molded compositions described in Examples VI and VII may be replaced with other acidic materials, particularly organic acidic materials, for example oxalic acid, phthalic acid, sulfamic acid, or shellac. In general, it is desirable to include a sufficient amount of a suitable compatible acidic material to reduce the flow time of the molding composition to about 35 to 120 seconds as determined on the Olsen-Bakelite flow tester at 150° C. However, it is not necessary that the flow time of the molding compositions be reduced in order to achieve molded products with the advantageous properties of the products described in Examples VI and VII.

An especial advantage in employing a reactive methylol-group-containing composition as a hardening agent such as the melamine formaldehyde addition product employed in Example V is the close control that is afforded over the rate of curing. Depending upon the proportion of melamine formaldehyde partial condensation product employed, either a fast or a slow rate of curing may be obtained. The degree of control of the rate of cure greatly exceeds that of conventional hardening agents such as hexamethylene tetramine which, even in large amounts, do not produce a fast rate of cure of products such as that described in Example I.

The process of the present invention and the products obtained, particularly those exemplified by Examples I-IV, have many advantageous and unexpected properties. Thus, as indicated hereinbefore, the product of the reaction between ortho-amino-diphenyl and the dicyandiamide-formaldehyde addition product can be completely and readily dehydrated by vacuum distillation. The resulting product, particularly when a substantial proportion of ortho-amino-diphenyl has been reacted with the dicyandiamide formaldehyde addition product, possesses solubility in organic solvents in which prior dicyandiamide-formaldehyde reaction products are insoluble, for example, xylol, benzol and especially furfural, furfuryl alcohol and the like. Consequently, such products are suitable for surface coatings with or without admixture with other materials. Other contemplated applications of these products include grinding wheels, the bonding agent of which comprises these new resins, with or without prior reaction with such substances as furfural; sizing agents for paper whereby initially formed soluble acid salts of these products are used to form insoluble metal salts, for example, an aluminum salt, in the paper; treating agents for leather; anti-creasing agents for textiles, whereby increased flexibility is obtained; adhesives, for example, for paper, wood, cloth and the like; casting resins; and numerous other uses for which these products are especially adaptable.

The fact that these products may be readily reacted with such aldehydes as furfural is an unexpected and highly advantageous characteristic since the unmodified dicyandiamide formaldehyde condensation products are insoluble in furfural and show little or no reaction therewith.

A most outstanding use of the new resins of this invention, as exemplified particularly by Examples V-VIII, is in forming molded insulation which exhibits exceptional electrical and mechanical properties.

Various modifications in the process and products of the present invention may be introduced without departing from the contemplated scope thereof. Thus, the order of reacting the ingredients and the reaction conditions may be varied to meet particular needs. Modifying agents may be introduced before, during or after chemical combination of dicyandiamide, formaldehyde and mono-amino-diphenyl. Such modifying agents include condensation catalysts, fillers, plasticizers, solvents, diluents, thermosetting and thermoplastic synthetic resins or their ingredients, natural resins and the like.

While formaldehyde, particularly aqueous solutions of formaldehyde (or compounds engendering formaldehyde) is the preferred aldehyde, other aldehydes than formaldehyde are included within the scope of this invention, for example, aliphatic aldehydes such as acetaldehyde, propionaldehyde, butyraldehyde, heptaldehyde, hexaldehyde; heterocyclic aldehydes such as furfural; unsaturated aldehydes such as acrolein or methacrolein; aromatic aldehydes such as benzaldehyde; dialdehydes such as glyoxal; and mixtures of aldehydes. Thus, reaction products of a mono-amino-diphenyl and dicyandiamide-aldehyde addition products broadly are comprehended by the present invention. The aldehyde dicyandiamide addition products may be termed alkylol dicyandiamides. In particular, as indicated by Examples I, II, III and IV, water-soluble aldehyde dicyandiamide addition products are contemplated.

Furthermore, when thermosetting compositions are prepared from mixtures of mono-amino-diphenyl modified dicyandiamide-aldehyde resins and partial condensation products prepared from an aldehyde and a thermosetting resin-forming reactant such as melamine, the scope of the aldehyde contemplated is that given above in preparing the mono-amino-diphenyl-dicyandiamide-aldehyde reaction product.

As alkaline condensing agents, strongly alkaline materials are generally preferred. These may be inorganic, for example, sodium or potassium hydroxide or carbonate; or organic, for example, quarternary ammonium bases such as dimethyl dibenzyl ammonium hydroxide, trimethyl benzyl ammonium hydroxide, tetraethyl ammonium hydroxide, tetraethanol ammonium hydroxide.

However, weaker bases may be employed when advantageous, for example, ammonia, amines such as ethylene diamine, alkylol amines, such as triethanol amine, basic salts such as trisodium phosphate. Mixtures of two or more alkaline condensing agents may be employed. When acid condensing agents are needed such acidic materials as mineral acids, e. g. hydrochloric or phosphoric acids; or organic acids, e. g. oxalic acid; or acid salts, e. g. monosodium phosphate, or mixtures thereof may be employed.

The temperatures at which the reactions are carried out may be varied according to the nature and proportion of the ingredients employed and the particular results desired. While dehydration by vacuum distillation is generally preferred, other dehydration means may be employed to remove undesired water and/or other volatile materials, for example, spray drying, or drum drying may be employed when advantageous.

In preparing molding compositions comprising the resinous products of this invention, various types of fillers may be employed, for example, cellulosic fillers such as wood flour, alpha-cellulose, walnut shell flour; heat resistant fillers such as asbestos and mica, fiberglas, mineral wool, cloth cuttings and the like, or mixtures thereof, for example, a mixture of wood flour and asbestos. Other materials may also be included, for example, dyes, pigments, plasticizers, mold lubricants and the like.

Thermosetting molding compositions prepared according to this invention may be molded, in general, at pressures of 2500–4000 pounds per square inch and at temperatures of 140–180° C.

What is claimed is:

1. A resinous composition comprising the condensation product of 0.5 to 2 molecular proportions of mono-ortho-amino-diphenyl and one molecular proportion of the addition product of 1 to 4 molecular proportions of formaldehyde with 1 molecular proportion of dicyandiamide.

2. A process of preparing a resinous composition comprising condensing 0.5 to 2 molecular proportions of mono-ortho-amino-diphenyl and one molecular proportion of the addition product of 1 to 4 molecular proportions of formaldehyde with 1 molecular proportion of dicyandiamide.

3. A resinous composition comprising the condensation product of 1 to 2 molecular proportions of chlorinated mono-ortho-amino-diphenyl with one molecular proportion of the addition product of 1 to 4 molecular proportions of formaldehyde with 1 molecular proportion of dicyandiamide.

4. A composition of matter comprising the condensation product of ingredients comprising 0.5–4 molecular proportions of a primary mono-amino-diphenyl free from aldehyde-reactive substituents, and one molecular proportion of the addition product of 1–4 molecular proportions of an aldehyde with one molecular proportion of dicyandiamide.

5. A composition of matter comprising the condensation product of ingredients comprising 0.5–4 molecular proportions of a primary mono-ortho-amino-diphenyl free from aldehyde-reactive substituents, and one molecular proportion of the addition product of 1–4 molecular proportions of an aldehyde with one molecular proportion of dicyandiamide.

6. A resinous composition of matter comprising the condensation product of ingredients comprising 0.5–4 molecular proportions of a primary mono-amino-diphenyl free from aldehyde-reactive substituents, and one molecular proportion of the addition product of 1–4 molecular proportions of formaldehyde with 1 molecular proportion of dicyandiamide.

7. A composition of matter comprising the condensation product of 0.5–4 molecular proportions of a primary mono-amino-diphenyl free from aldehyde-reactive substituents, and one molecular proportion of the water-soluble addition product of 1–4 molecular proportions of an aldehyde with one molecular proportion of dicyandiamide.

8. A composition of matter comprising the condensation product of ingredients comprising 0.5–4 molecular proportions of a primary mono-ortho-amino-diphenyl free from aldehyde-reactive substituents, and one molecular proportion of the addition product of 1–4 molecular proportions of formaldehyde with one molecular proportion of dicyandiamide.

9. A composition of matter comprising the condensation product of 0.5–4 molecular proportions of a primary mono-amino-diphenyl free from aldehyde-reactive substituents, and one molecular proportion of the water-soluble addition product of 1–4 molecular proportions of an aliphatic aldehyde with one molecular proportion of dicyandiamide.

10. A substantially water-free composition of matter comprising the condensation product of 0.5–4 molecular proportions of a primary mono-ortho-amino-diphenyl free from aldehyde-reactive substituents, and one molecular proportion of the addition product of 1–4 molecular proportions of formaldehyde with one molecular proportion of dicyandiamide.

11. A thormosetting molding composition comprising the condensation product of 0.5–4 molecular proportions of mono-ortho-amino-diphenyl and one molecular proportion of the addition product of 1–4 molecular proportions of formaldehyde with one molecular proportion of dicyandiamide, a heat-curable melamine-formaldehyde resin and a filler, the resin being present in an amount equivalent to 25–400 parts for each 100 parts of the condensation product.

12. A composition of matter comprising the condensation product of ingredients comprising 0.5–4 molecular proportions of a chlorinated primary mono-amino-diphenyl free from aldehyde-reactive substituents, and one molecular proportion of the addition product of 1–4 molecular proportions of an aldehyde with one molecular proportion of dicyandiamide.

13. A thermosetting resinous composition comprising the composition of matter defined in claim 4, having incorporated therein a thermosetting agent from the group consisting of hexamethylenetetramine, aldehydes and thermosetting aldehyde condensation products containing dicyandiamide-reactive alkylol groups, said thermosetting agent being present in sufficient amount equivalent to 25–400 parts for each 100 parts of the composition of matter in order to render the composition of matter thermosetting.

14. A thermosetting resinous composition comprising the composition of matter defined in claim 4, having incorporated therein a thermosetting aldehyde condensation product containing dicyandiamide-reactive alkylol groups, said condensation product being present in sufficient amount equivalent to 25–400 parts for each 100 parts of the composition of matter in order to render said composition of matter thermosetting.

15. A thermosetting resinous composition comprising a composition of matter defined in claim 7 having incorporated therein an additional quantity of an aldehyde in sufficient amount equivalent to 25–400 parts for each 100 parts of the composition of matter in order to render said composition of matter thermosetting.

16. A thermosetting resinous composition comprising the composition of matter defined in claim 4 having incorporated therein hexamethylenetetramine in sufficient amount equivalent to 25–400 parts for each 100 parts of the composition of matter in order to render said composition of matter thermosetting.

17. A thermosetting resinous composition comprising the composition of matter defined in claim 6 having incorporated therein a water-soluble melamine-formaldehyde condensation product in sufficient amount equivalent to 25–400 parts for each 100 parts of the composition of matter in order to render said composition of matter thermosetting.

18. A thermosetting molding composition comprising the substantially neutral reacted product of one mol of mono-ortho-amino-diphenyl and one mol of dimethylol dicyandiamide, an alkaline reacted heat-curable resin made from melamine and formaldehyde in a molar ratio of 1:4 and a filler, said heat-curable resin being present in an amount equivalent to 25–400 parts for each 100 parts of the reaction product in order to render the reaction product thermosetting.

19. A composition of matter comprising the condensation product of 0.5–4 molecular proportions of a primary mono-amino-diphenyl free from aldehyde-reactive substituents and one molecular proportion of the water-soluble addition product of 1–4 molecular proportion of formaldehyde with one molecular proportion of dicyandiamide.

20. A composition of matter comprising the condensation product of 0.5–4 molecular proportions of a primary mono-ortho-amino-diphenyl free from aldehyde reactive substituents and one molecular proportion of the water-soluble addition product of 1–4 molecular proportions of an aldehyde with one molecular proportion of dicyandiamide.

21. A composition of matter comprising the condensation product of 0.5–4 molecular proportions of mono-ortho-amino-diphenyl and one molecular proportion of the water-soluble addition product of 1–4 molecular proportions of formaldehyde with one molecular proportion of dicyandiamide.

MILTON J. SCOTT.

REFERENCES CITED

The following references are of record in the file of this patent:

UNITED STATES PATENTS

| Number | Name | Date |
|---|---|---|
| 2,367,036 | McQueen | Jan. 9, 1945 |